United States Patent
Lai

(10) Patent No.: US 8,544,908 B1
(45) Date of Patent: Oct. 1, 2013

(54) ELECTROMAGNETIC PICK-AND-PLACE DEVICE FOR USE WITH PROCESSING APPARATUS

(75) Inventor: Ton-Shih Lai, Taichung (TW)

(73) Assignee: Max See Industry Co., Ltd., Taichung (TW)

( * ) Notice: Subject to any disclaimer, the term of this patent is extended or adjusted under 35 U.S.C. 154(b) by 0 days.

(21) Appl. No.: 13/477,411

(22) Filed: May 22, 2012

(51) Int. Cl.
*B25J 15/06* (2006.01)

(52) U.S. Cl.
USPC .............................. 294/2; 294/65.5; 294/185

(58) Field of Classification Search
USPC ............ 294/65.5, 2, 185, 190; 335/289–294; 414/749.2; 901/40
See application file for complete search history.

(56) References Cited

U.S. PATENT DOCUMENTS

| | | | |
|---|---|---|---|
| 2,976,075 A * | 3/1961 | Budreck | 294/65.5 |
| 3,159,418 A * | 12/1964 | Hansen | 294/2 |
| 4,121,865 A * | 10/1978 | Littwin, Sr. | 294/2 |
| 4,504,088 A * | 3/1985 | Carter | 294/65.5 |
| 6,065,789 A * | 5/2000 | Nagai et al. | 294/185 |
| 6,538,544 B1 * | 3/2003 | Hardy | 335/285 |
| 7,086,675 B2 * | 8/2006 | Jacobs | 294/2 |
| 2005/0218678 A1 * | 10/2005 | De Bibikoff | 294/65.5 |

* cited by examiner

*Primary Examiner* — Dean Kramer
(74) *Attorney, Agent, or Firm* — Muncy, Geissler, Olds & Lowe, PLLC

(57) ABSTRACT

An electromagnetic pick-and-place device for use with a processing apparatus is provided. The electromagnetic pick-and-place device essentially includes a fixing base, a fixing axle penetratingly disposed at the fixing base, and an electric magnet disposed at the fixing axle, which move together in operation so as to be positioned right above a workpiece. Then, the workpiece is gripped by suction with electromagnetic pick-and-place device under a magnetic force generated from the electric magnet. Afterward, the electromagnetic pick-and-place device and the workpiece move together to a processing position. Eventually, the magnetic force of the electric magnet is disabled in order to free the workpiece; at this point in time, the processing apparatus can start processing the workpiece.

4 Claims, 4 Drawing Sheets

ELECTROMAGNETIC PICK-AND-PLACE DEVICE FOR USE WITH PROCESSING APPARATUS

BACKGROUND OF THE INVENTION

1. Technical Field

The present invention relates to processing apparatuses, and more particularly, to an electromagnetic pick-and-place device for use with a processing apparatus.

2. Description of Related Art

A conventional processing apparatus essentially comprises a working table and a cutting tool. Prior to a processing process, a workpiece is fetched and brought to a predetermined processing position on the working table by means of a workpiece fetching mechanism. After the workpiece has been successfully fetched and brought to the predetermined processing position, the processing process is performed on the workpiece with the cutting tool.

The workpiece fetching mechanisms in wide use generally fall into two categories, namely a suction cup-based fetching mechanism and a mechanical clamp-based fetching mechanism. Suction cups provide limited suction and thus are not capable of fetching any heavy workpiece. Mechanical clamp are only good at fetching a workpiece of a specific shape (such as a round shape.) As a result, the use of the two workpiece fetching mechanisms is subjected to limitations.

SUMMARY OF THE INVENTION

It is an objective of the present invention to provide an electromagnetic pick-and-place device that is adapted for use with a processing apparatus and is capable of fetching heavy workpieces of any shape.

In order to achieve the above and other objectives, the present invention provides an electromagnetic pick-and-place device comprising a fixing base, a fixing axle, an electric magnet, and a resilient element. The fixing base has a chamber. The fixing axle is disposed in the chamber of the fixing base and has a fixing end. The electric magnet is positioned on the bottom side of the fixing base and has a fixing hole for fixing the fixing end of the fixing axle in place. The resilient element is received in the chamber of the fixing base and has one end abutting against the fixing axle for providing a buffering effect. Hence, a magnetic force generated by the electric magnet not only provides a strong carrying force but is also capable of gripping workpieces of different shapes by suction so as to achieve the objectives of the present invention.

Regarding the electromagnetic pick-and-place device of the present invention, the top end of the fixing axle is connected to a gas inlet connector, whereas an air passage penetrates the fixing axle. The air passage is in communication with the gas inlet connector and the fixing hole of the electric magnet. Hence, external compressed air can be introduced into the air passage of the fixing axle via the gas inlet connector and then ejected from the fixing hole of the electric magnet to fall on the surface of the workpiece for removing the dust or other impurities therefrom.

Regarding the electromagnetic pick-and-place device of the present invention, the fixing base has a lid, whereas the fixing axle has an axial section and a radial section. The axial section has a fixing end. The radial section extends outward and radially from the outer circumferential surface of the axial section. A groove is formed between the radial section and the axial section. The two ends of the resilient element abut against the lid and the bottom wall of the groove, respectively, to provide a buffering effect.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE EMBODIMENT OF THE INVENTION

Figure 1:
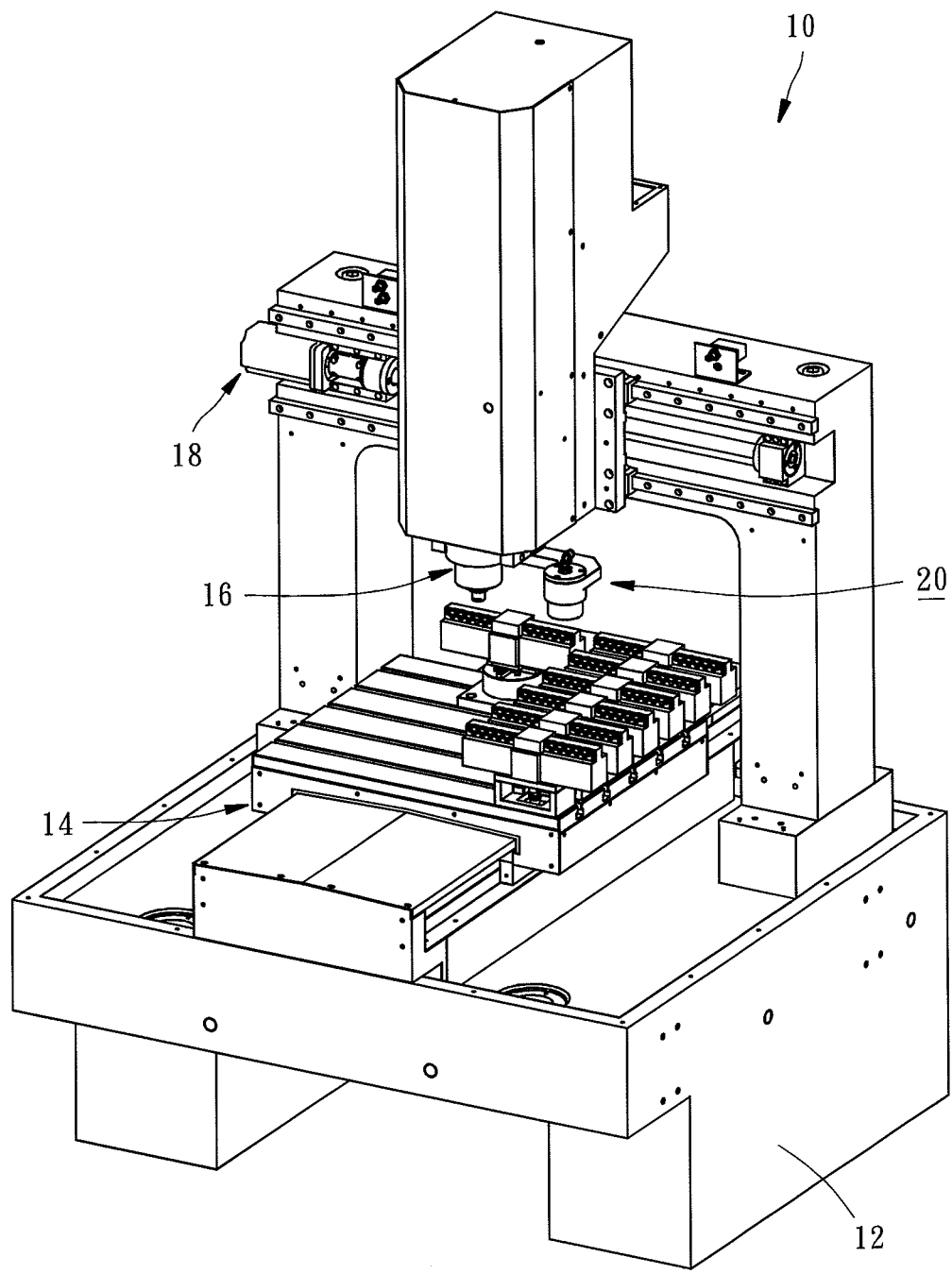
FIG. 1 is a perspective view of a processing apparatus according to the preferred embodiment of the present invention.
Figure 2:
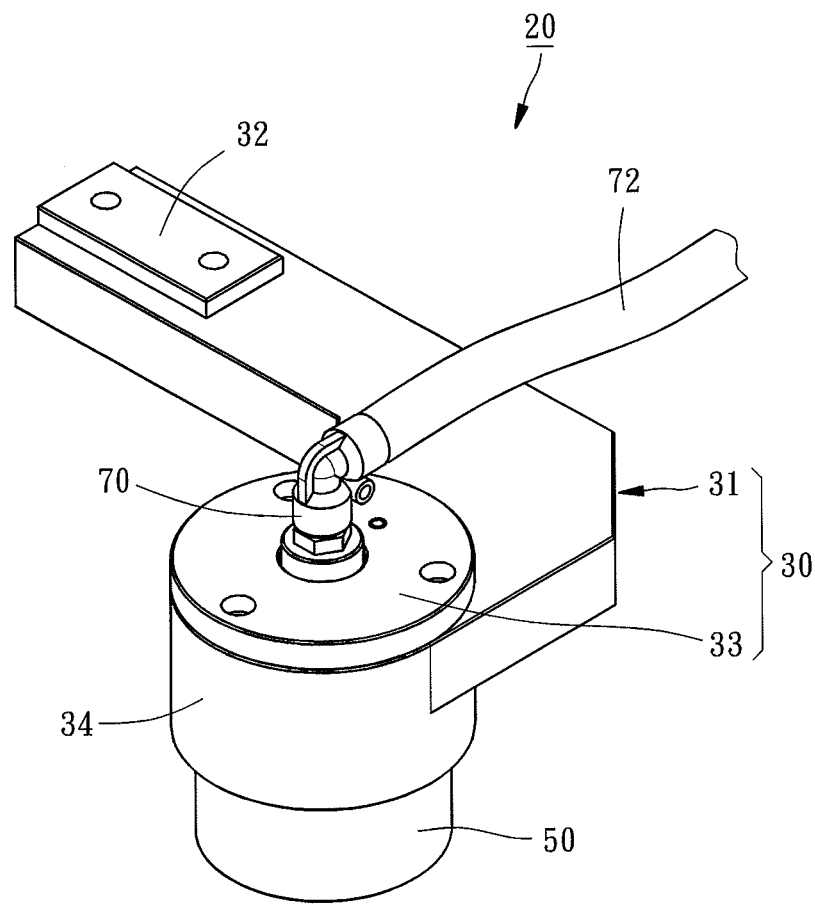
FIG. 2 is a perspective view of an electromagnetic pick-and-place device according to the preferred embodiment of the present invention.
Figure 3:
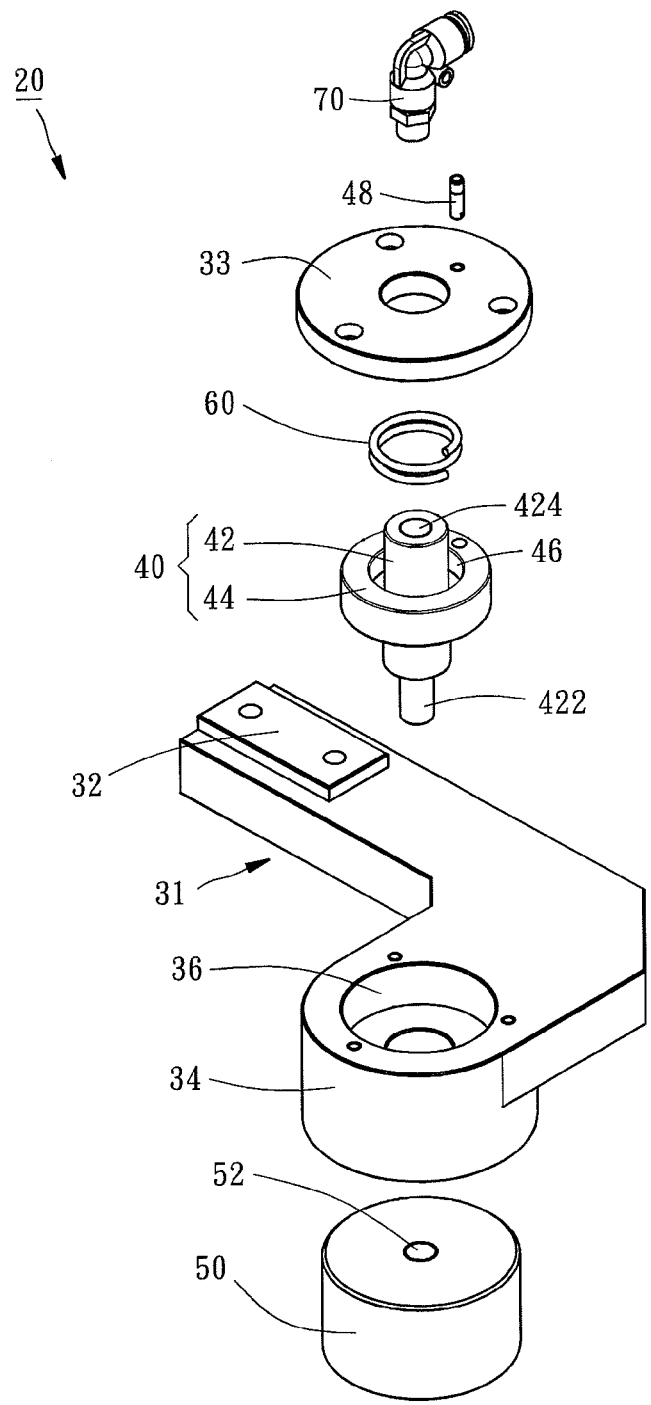
FIG. 3 is an exploded view of the electromagnetic pick-and-place device according to the preferred embodiment of the present invention.
Figure 4:
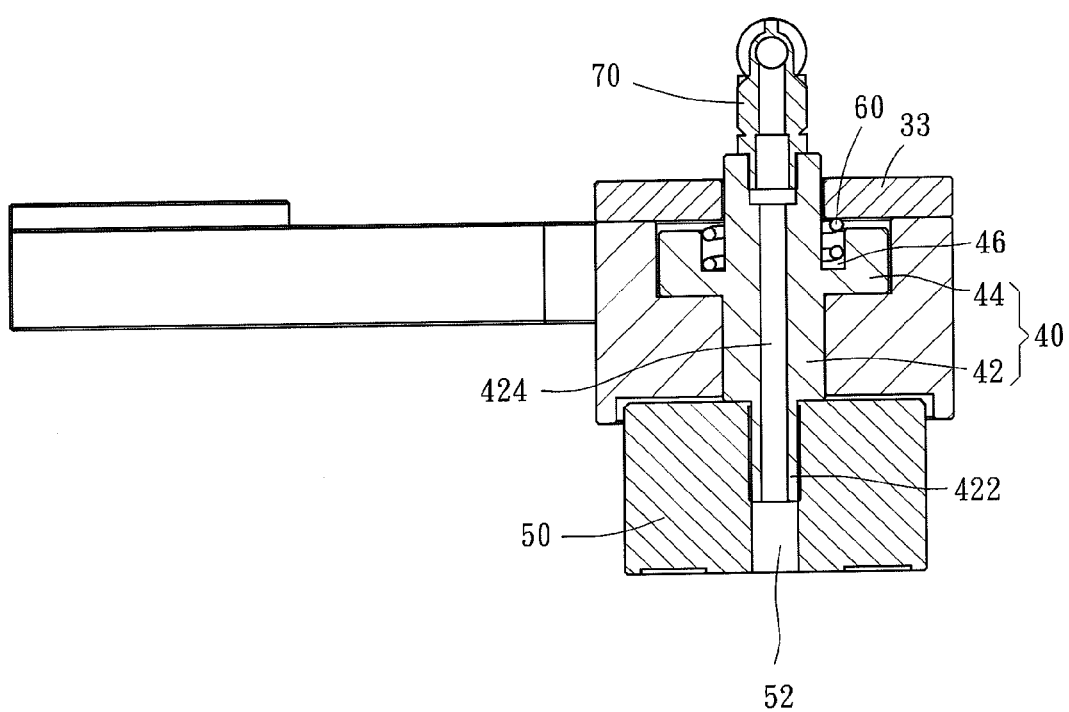
FIG. 4 is a cross-sectional view of the electromagnetic pick-and-place device according to the preferred embodiment of the present invention.

Referring to FIG. 1, there is shown a perspective view of a processing apparatus 10 according to the preferred embodiment of the present invention. As shown in FIG. 1, the processing apparatus 10 essentially comprises a support 12, a working table 14, and a spindle device 16. The working table 14 is disposed on the support 12 and is horizontally movable relative to the support 12 by means of a driving device (not shown). The spindle device 16 is disposed above the support 12. The spindle device 16 is horizontally and vertically movable relative to the support 12 by means of a driving device 18. Referring to FIG. 2 through FIG. 4, in the preferred embodiment of the present invention, an electromagnetic pick-and-place device 20 comprises a fixing base 30, a fixing axle 40, an electric magnet 50, a resilient element 60, and a gas inlet connector 70.

The fixing base 30 has a base 31 and a lid 33. A stage 32 is disposed at one end of the base 31 to allow the fixing base 30 to be disposed at the spindle device 16 of the processing apparatus 10. A cylindrical fixing portion 34 is disposed at the other end of the base 31. A chamber 36 is provided in the fixing portion 34. The lid 33 is fixed to the top side of the fixing portion 34 of the base 31 and covers the opening of the chamber 36.

The fixing axle 40 passes through the lid 33 of the fixing base 30 and is disposed in the chamber 36 of the fixing base 30. The fixing axle 40 has an axial section 42 and a radial section 44. The axial section 42 has a fixing end 422. The fixing end 422 protrudes from the bottom side of the fixing portion 34 of the fixing base 30 and has an external thread. An air passage 424 penetrates the axial section 42 axially. The radial section 44 extends outward and radially from the outer circumferential surface of the axial section 42. A groove 46 is formed between the radial section 44 and the axial section 42. The radial section 44 is fixed to the lid 33 of the fixing base 30 by means of a pin 48.

The electric magnet 50 has a fixing hole 52. The fixing hole 52 is in communication with the air passage 424 of the fixing axle 40. An internal thread is disposed on the wall of the fixing hole 52, such that the electric magnet 50 is fixed to the fixing end 422 of the fixing axle 40 by a screwing means and thereby positioned on the bottom side of the fixing portion 34 of the fixing base 30.

The resilient element 60 is received in the chamber 36 of the fixing base 30 and has two ends abutting against the lid 33 of the fixing base 30 and the bottom wall of the groove 46 of the fixing axle 40, respectively.

The gas inlet connector 70 has one end connected to the top end of the axial section 42 of the fixing axle 40 and being in communication with the air passage 424 of the fixing axle 40, and has the other end connected to a gas source (not shown) by a pipe 72 for introducing compressed air into the air passage 424 of the fixing axle 40. The gas inlet connector 70 can be dispensed with as needed.

To start operating the electromagnetic pick-and-place device 20, a worker uses the driving device 18 to move the electric magnet 50 horizontally until the electric magnet 50 is right above the workpiece, and then starts the gas source to allow compressed air to be released from the gas source and introduced into the air passage 424 of the fixing axle 40 via the gas inlet connector 70. Afterward, the compressed air is ejected from the fixing hole 52 of the electric magnet 50 to fall on the workpiece surface for removing dust or other impurities from the workpiece surface. Finally, the worker turns on the power to the electric magnet 50 to enable the electric magnet 50 to generate a magnetic force for gripping the workpiece by suction. At the point in time when the electric magnet 50 attracts and grips the workpiece, the resilient element 60 provides a buffering force to offset the impact of the workpiece on the electric magnet 50 so as to protect the electric magnet 50 against damage. Afterward, the worker uses the driving device 18 again to move the workpiece to a processing position, and then turns off the power to the electric magnet 50 to separate the workpiece from the electric magnet 50. At this point in time, the workpiece can be processed with the spindle device 16.

In conclusion, the electromagnetic pick-and-place device 20 of the present invention is characterized in that the magnetic force generated by the electric magnet 50 not only provides a strong carrying force for gripping a heavy workpiece by suction but is also capable of gripping workpieces of different shapes by suction so as to achieve the objectives of the present invention.

What is claimed is:

1. An electromagnetic pick-and-place device for use with a processing apparatus, comprising:
   a fixing base having a chamber;
   a fixing axle disposed in the chamber of the fixing base and having a fixing end;
   an electric magnet positioned on a bottom side of the fixing base and having a fixing hole for fixing the fixing end of the fixing axle in place;
   a resilient element received in the chamber of the fixing base and having an end abutting against the fixing axle, and
   a gas inlet connector connected to a top end of the fixing axle, the fixing axle being penetrated by an air passage in communication with the gas inlet connector and the fixing hole of the electric magnet, wherein the fixing base has a lid, and the fixing axle has an axial section and a radial section, the axial section having the fixing end and the air passage, the radial section extending outward and radially from an outer circumferential surface of the axial section, wherein a groove is formed between the radial section and the axial section, wherein two ends of the resilient element abut against the lid and a bottom wall of the groove, respectively.

2. The electromagnetic pick-and-place device of claim 1, wherein the radial section of the fixing axle is fixed to the lid by a pin.

3. The electromagnetic pick-and-place device of claim 1, wherein the fixing base has a base with an end having a stage and another end having a fixing portion, the fixing portion having the chamber, wherein the lid is disposed on a top side of the fixing portion of the base and covers an opening of the chamber.

4. The electromagnetic pick-and-place device of claim 1, wherein the fixing end of the fixing axle has an external thread, and the fixing hole of the electric magnet has an internal thread, such that the electric magnet is fixed to the fixing end of the fixing axle by a screwing means.

\* \* \* \* \*